US012412585B2

(12) United States Patent
Vasilache

(10) Patent No.: US 12,412,585 B2
(45) Date of Patent: Sep. 9, 2025

(54) TRANSFORMING SPATIAL AUDIO PARAMETERS

(71) Applicant: NOKIA TECHNOLOGIES OY, Espoo (FI)

(72) Inventor: Adriana Vasilache, Tampere (FI)

(73) Assignee: NOKIA TECHNLOGIES OY, Espoo (FI)

( * ) Notice: Subject to any disclaimer, the term of this patent is extended or adjusted under 35 U.S.C. 154(b) by 174 days.

(21) Appl. No.: 18/261,783

(22) PCT Filed: Jan. 18, 2021

(86) PCT No.: PCT/FI2021/050023
§ 371 (c)(1),
(2) Date: Jul. 17, 2023

(87) PCT Pub. No.: WO2022/152960
PCT Pub. Date: Jul. 21, 2022

(65) Prior Publication Data
US 2024/0079014 A1 Mar. 7, 2024

(51) Int. Cl.
*G10L 19/008* (2013.01)
*G10L 19/032* (2013.01)
(Continued)

(52) U.S. Cl.
CPC .......... *G10L 19/008* (2013.01); *G10L 19/032* (2013.01); *H04S 3/008* (2013.01);
(Continued)

(58) Field of Classification Search
CPC ..... G10L 19/008; G10L 19/032; H04S 3/008; H04S 7/30; H04S 2400/01; H04S 2400/11; H04S 2420/03
See application file for complete search history.

(56) References Cited

U.S. PATENT DOCUMENTS 12,046,250 B2 7/2024 Vasilache
12,260,868 B2 * 3/2025 Vasilache .............. G10L 19/008
(Continued)

FOREIGN PATENT DOCUMENTS

CN 111656442 B * 6/2024 ............. G10L 19/00
GB 2577698 A 4/2020
(Continued)

OTHER PUBLICATIONS

Politis et al., "Sector-Based Parametric Sound Field Reproduction in the Spherical Harmonic Domain", IEEE Journal of Selected Topics in Signal Processing, vol. 9, No. 5, (Aug. 2015), 15 pages.
(Continued)

*Primary Examiner* — David L Ton
(74) *Attorney, Agent, or Firm* — ALSTON & BIRD LLP

(57) ABSTRACT

There is inter alia disclosed an apparatus for spatial audio encoding configured to: determine, for two or more audio signals, a first spatial audio direction parameter and a second spatial audio direction parameter for providing spatial audio reproduction: quantize the first spatial audio direction parameter (301); transform the second spatial audio direction parameter to have an opposite spatial audio direction (303); determine a difference between the transformed second spatial audio direction parameter and the quantized first spatial audio direction parameter (305); and quantize the difference (307).

20 Claims, 4 Drawing Sheets

(51) Int. Cl.
*H04S 3/00* (2006.01)
*H04S 7/00* (2006.01)

(52) U.S. Cl.
CPC ............ *H04S 7/30* (2013.01); *H04S 2400/01* (2013.01); *H04S 2400/11* (2013.01); *H04S 2420/03* (2013.01)

(56) References Cited

U.S. PATENT DOCUMENTS

| | | | | |
|---|---|---|---|---|
| 2020/0265851 | A1 | 8/2020 | Fuchs et al. | |
| 2024/0046939 | A1* | 2/2024 | Vasilache .............. | G10L 19/008 |

FOREIGN PATENT DOCUMENTS

| | | | |
|---|---|---|---|
| GB | 2595883 | A | 12/2021 |
| WO | WO 2017/005978 | A1 | 1/2017 |
| WO | WO 2019/091575 | A1 | 5/2019 |
| WO | WO 2019/106221 | A1 | 6/2019 |
| WO | WO 2019/129350 | A1 | 7/2019 |
| WO | WO 2019/215391 | A1 | 11/2019 |
| WO | WO 2020/008105 | A1 | 1/2020 |
| WO | WO 2020/089510 | A1 | 5/2020 |
| WO | WO 2020/193865 | A1 | 10/2020 |
| WO | WO 2020/260756 | A1 | 12/2020 |
| WO | WO 2021/130405 | A1 | 7/2021 |

OTHER PUBLICATIONS

Cheng et al., “A General Compression Approach to Multi-Channel Three-Dimensional Audio”, IEEE Transactions on Audio, Speech, and Language Processing, vol. 21, No. 8, (Aug. 2013), 13 pages.

Extended European Search Report for European Application No. 21919202.8 dated Sep. 3, 2024, 4 pages.

International Search Report and Written Opinion for Patent Cooperation Treaty Application No. PCT/FI2021/050023 dated Feb. 7, 2022, 16 pages.

Nokia Corporation, “Description of the IVAS MASA C Reference Software”, 3GPP TSG-SA4 #106 meeting, S4-191167, (Oct. 21-25, 2019), 16 pages.

Nokia Corporation, “Proposal for MASA common metadata and metadata structure”, 3GPP TSG-SA4#101 meeting, S4-181353, (Nov. 19-23, 2018), 4 pages.

Yang et al., “Multi-channel Object-Based Spatial Parameter Compression Approach for 3D Audio”, Advances in Multimedia Information Processing—PCM 2015, (Nov. 22, 2015), 11 pages.

Office Action for Canadian Application No. 3,208,666 dated Nov. 7, 2024, 4 pages.

Office Action for European Application No. 21919202.8 dated May 23, 2025, 4 pages.

* cited by examiner

TRANSFORMING SPATIAL AUDIO PARAMETERS

CROSS-REFERENCE TO RELATED APPLICATIONS

This application is a national phase entry of International Application No. PCT/FI2021/050023, filed Jan. 18, 2021, the contents of which are hereby incorporated by reference in their entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters is of considerable interest in order to minimise the overall number of bits required to represent the spatial audio parameters.

SUMMARY

There is according to a first aspect a method for spatial audio encoding comprising: determining, for two or more audio signals, a first spatial audio direction parameter and a second spatial audio direction parameter for providing spatial audio reproduction; quantising the first spatial audio direction parameter; transforming the second spatial audio direction parameter to have an opposite spatial audio direction; determining a difference between the transformed second spatial audio direction parameter and the quantized first spatial audio direction parameter; and quantising the difference.

Transforming the second spatial audio direction parameter to have an opposite spatial audio direction, determining a difference between the transformed second spatial audio direction and the quantized first spatial audio direction, and quantising the difference may be conditional upon a first direct-to-total energy ratio parameter for the two or more audio signals being greater than a pre-determined threshold value.

Alternatively transforming the second spatial audio direction parameter to have an opposite spatial audio direction, determining a difference between the transformed second spatial audio direction and the quantized first spatial audio direction, and quantising the difference may be conditional upon a number of bits used to quantise the quantized first spatial audio direction being above a pre-determined threshold value.

Transforming the second spatial audio direction to have an opposite spatial audio direction may comprise rotating the second spatial audio direction parameter by an angle of one hundred and eighty degrees.

The second spatial audio direction parameter may comprise an azimuth value, and wherein the first spatial audio direction parameter comprises an azimuth value.

Transforming the second spatial audio direction to have an opposite spatial audio direction may comprise transforming the azimuth value of the second spatial audio direction parameter through one hundred and eighty degrees, and wherein determining a difference between the transformed second spatial audio direction and the quantized first spatial audio direction may comprise determining the difference between the transformed azimuth value of the second spatial audio direction parameter and the quantized azimuth value of the quantized first spatial audio direction parameter.

The first spatial audio parameter may be associated with a first sound source direction in a frequency sub band and time sub frame of the two or more audio signals, and the second spatial audio parameter is associated with a second sound source direction in the frequency sub band and the time sub frame of the two or more audio signals.

There is according to a second aspect a method for spatial audio decoding comprising: adding a quantized difference to a quantized first spatial audio direction parameter to give a transformed second spatial audio direction parameter, wherein the quantized difference is a quantized difference between the transformed second spatial audio direction parameter and the quantized first spatial audio direction parameter; and transforming the second spatial audio direction parameter to have an opposite spatial audio direction.

Adding the quantized difference to the quantized first spatial audio direction parameter to give the transformed second spatial audio direction parameter, and transforming the second spatial audio direction parameter to have an opposite spatial audio direction may be conditional upon a first direct-to-total energy ratio parameter being greater than a pre-determined threshold value.

Alternatively, adding the quantized difference to the quantized first spatial audio direction parameter to give the transformed second spatial audio direction parameter, and transforming the second spatial audio direction parameter to have an opposite spatial audio direction may be conditional upon a number of bits used to quantise the quantized first spatial audio direction being above a pre-determined threshold value.

Transforming the second spatial audio direction to have an opposite spatial audio direction may comprise rotating the second spatial audio direction parameter by an angle of one hundred and eighty degrees.

The second spatial audio direction parameter may comprise an azimuth value, and wherein the first spatial audio direction parameter may comprise an azimuth value.

Transforming the second spatial audio direction to have an opposite spatial audio direction may comprise transforming the azimuth value of the second spatial audio direction parameter through one hundred and eighty degrees, and wherein adding the quantized difference to the quantized first spatial audio direction parameter to give the transformed second spatial audio direction parameter may comprise adding the quantized difference to the quantized azimuth value of the quantized first spatial audio direction parameter.

There is provided according to a third aspect an apparatus for spatial audio encoding comprising means for determining, for two or more audio signals, a first spatial audio direction parameter and a second spatial audio direction parameter for providing spatial audio reproduction; means for quantising the first spatial audio direction parameter; transforming the second spatial audio direction parameter to have an opposite spatial audio direction; means for determining a difference between the transformed second spatial audio direction parameter and the quantized first spatial audio direction parameter; and means for quantising the difference.

The means for transforming the second spatial audio direction parameter to have an opposite spatial audio direction, means for determining a difference between the transformed second spatial audio direction and the quantized first spatial audio direction, and the means for quantising the difference may be conditional upon a first direct-to-total energy ratio parameter for the two or more audio signals being greater than a pre-determined threshold value.

The means for transforming the second spatial audio direction parameter to have an opposite spatial audio direction, the means for determining a difference between the transformed second spatial audio direction and the quantized first spatial audio direction, and the means for quantising the difference may be conditional upon a number of bits used to quantise the quantized first spatial audio direction being above a pre-determined threshold value.

The means for transforming the second spatial audio direction to have an opposite spatial audio direction may comprise means for rotating the second spatial audio direction parameter by an angle of one hundred and eighty degrees.

The second spatial audio direction parameter may comprise an azimuth value, and wherein the first spatial audio direction parameter may comprise an azimuth value.

The means for transforming the second spatial audio direction to have an opposite spatial audio direction may comprise means for transforming the azimuth value of the second spatial audio direction parameter through one hundred and eighty degrees, and wherein the means for determining a difference between the transformed second spatial audio direction and the quantized first spatial audio direction may comprise means for determining the difference between the transformed azimuth value of the second spatial audio direction parameter and the quantized azimuth value of the quantized first spatial audio direction parameter.

The first spatial audio parameter may be associated with a first sound source direction in a frequency sub band and time sub frame of the two or more audio signals, and the second spatial audio parameter may be associated with a second sound source direction in the frequency sub band and the time sub frame of the two or more audio signals.

There is provided according to a fourth aspect an apparatus for spatial audio decoding comprising means for adding a quantized difference to a quantized first spatial audio direction parameter to give a transformed second spatial audio direction parameter, wherein the quantized difference is a quantized difference between the transformed second spatial audio direction parameter and the quantized first spatial audio direction parameter; and means for transforming the second spatial audio direction parameter to have an opposite spatial audio direction.

The means for adding the quantized difference to the quantized first spatial audio direction parameter to give the transformed second spatial audio direction parameter, and the means for transforming the second spatial audio direction parameter to have an opposite spatial audio direction may be conditional upon a first direct-to-total energy ratio parameter being greater than a pre-determined threshold value.

Alternatively, The means for adding the quantized difference to the quantized first spatial audio direction parameter to give the transformed second spatial audio direction parameter, and the means for transforming the second spatial audio direction parameter to have an opposite spatial audio direction may be conditional upon a number of bits used to quantise the quantized first spatial audio direction being above a pre-determined threshold value.

The means for transforming the second spatial audio direction to have an opposite spatial audio direction may comprise means for rotating the second spatial audio direction parameter by an angle of one hundred and eighty degrees.

The second spatial audio direction parameter may comprise an azimuth value, and wherein the first spatial audio direction parameter may comprise an azimuth value.

The means transforming the second spatial audio direction to have an opposite spatial audio direction may comprise means for transforming the azimuth value of the second spatial audio direction parameter through one hundred and eighty degrees, and wherein the means for adding the quantized difference to the quantized first spatial audio direction parameter to give the transformed second spatial audio direction parameter may comprise means for adding the quantized difference to the quantized azimuth value of the quantized first spatial audio direction parameter.

According to a fifth aspect there is an apparatus for spatial audio encoding comprising at least one processor and at least one memory including computer program code, the at least one memory and the computer program code configured to determine, for two or more audio signals, a first spatial audio direction parameter and a second spatial audio direction parameter for providing spatial audio reproduction; quantising the first spatial audio direction parameter; transform the second spatial audio direction parameter to have an opposite spatial audio direction; determine a difference between the transformed second spatial audio direction parameter and the quantized first spatial audio direction parameter; and quantise the difference.

According to a sixth aspect there is an apparatus for spatial audio decoding comprising at least one processor and at least one memory including computer program code, the at least one memory and the computer program code configured to add a quantized difference to a quantized first spatial audio direction parameter to give a transformed second spatial audio direction parameter, wherein the quantized difference is a quantized difference between the transformed second spatial audio direction parameter and the quantized first spatial audio direction parameter; and transform the second spatial audio direction parameter to have an opposite spatial audio direction.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
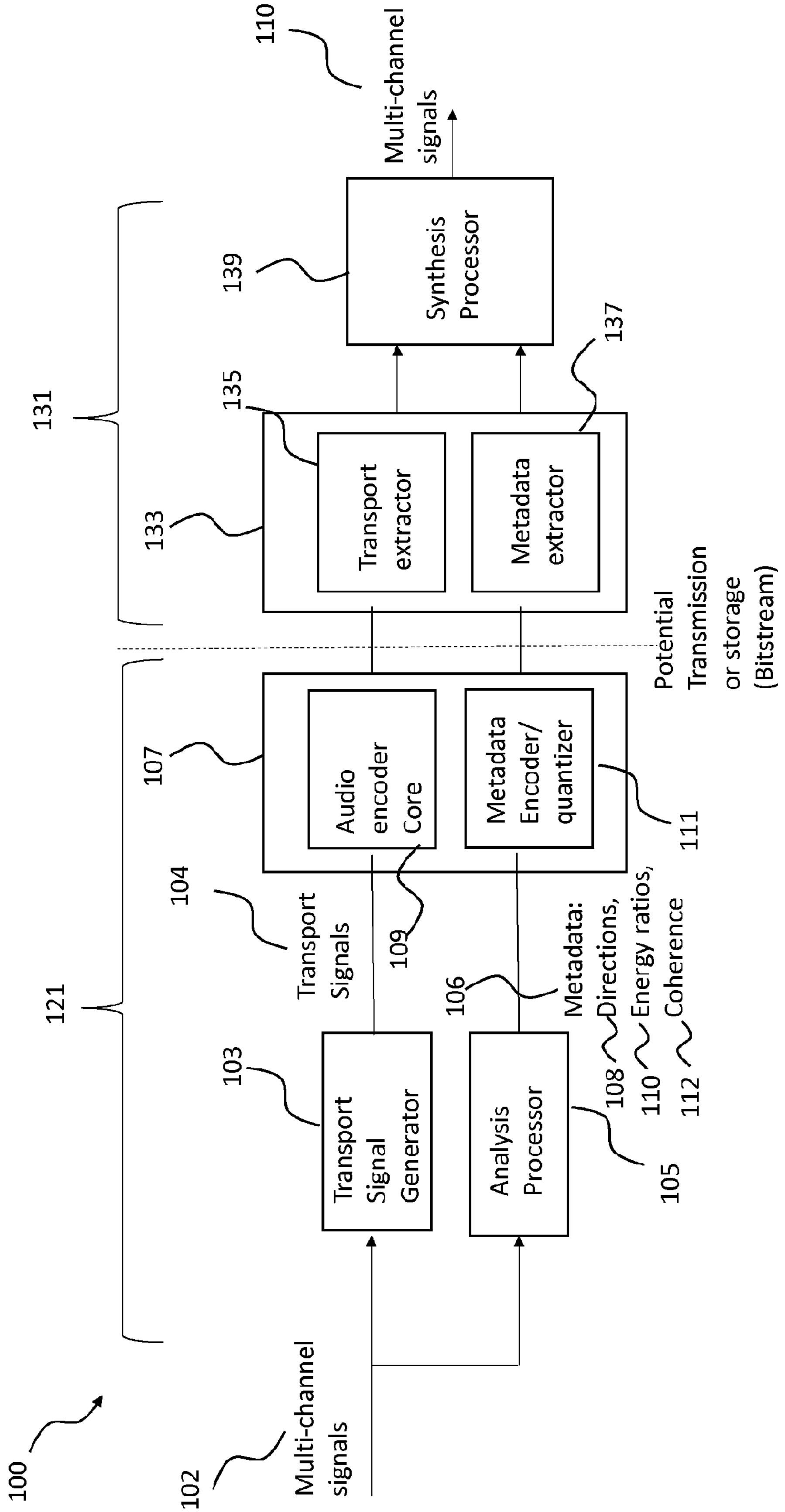
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata consists at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which make up the metadata for IVAS are shown in Table 1 below.

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

Moreover, in some instances metadata assisted spatial audio (MASA) may support up to two directions for each TF tile which would require the above parameters to be encoded and transmitted for each direction on a per TF tile basis. Thereby increasing doubling the required bit rate according to Table 1. In addition, it is easy to foresee that other MASA systems may support more than two directions per TF tile.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to improve the efficiency of quantising the spatial audio direction parameters by transforming the direction parameter associated with each sound source (on a per TF tile basis) to point in the same direction.

In this regard FIG. 1 depicts an example apparatus and system for implementing embodiments of the application. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case or indeed a MASA format) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 2:
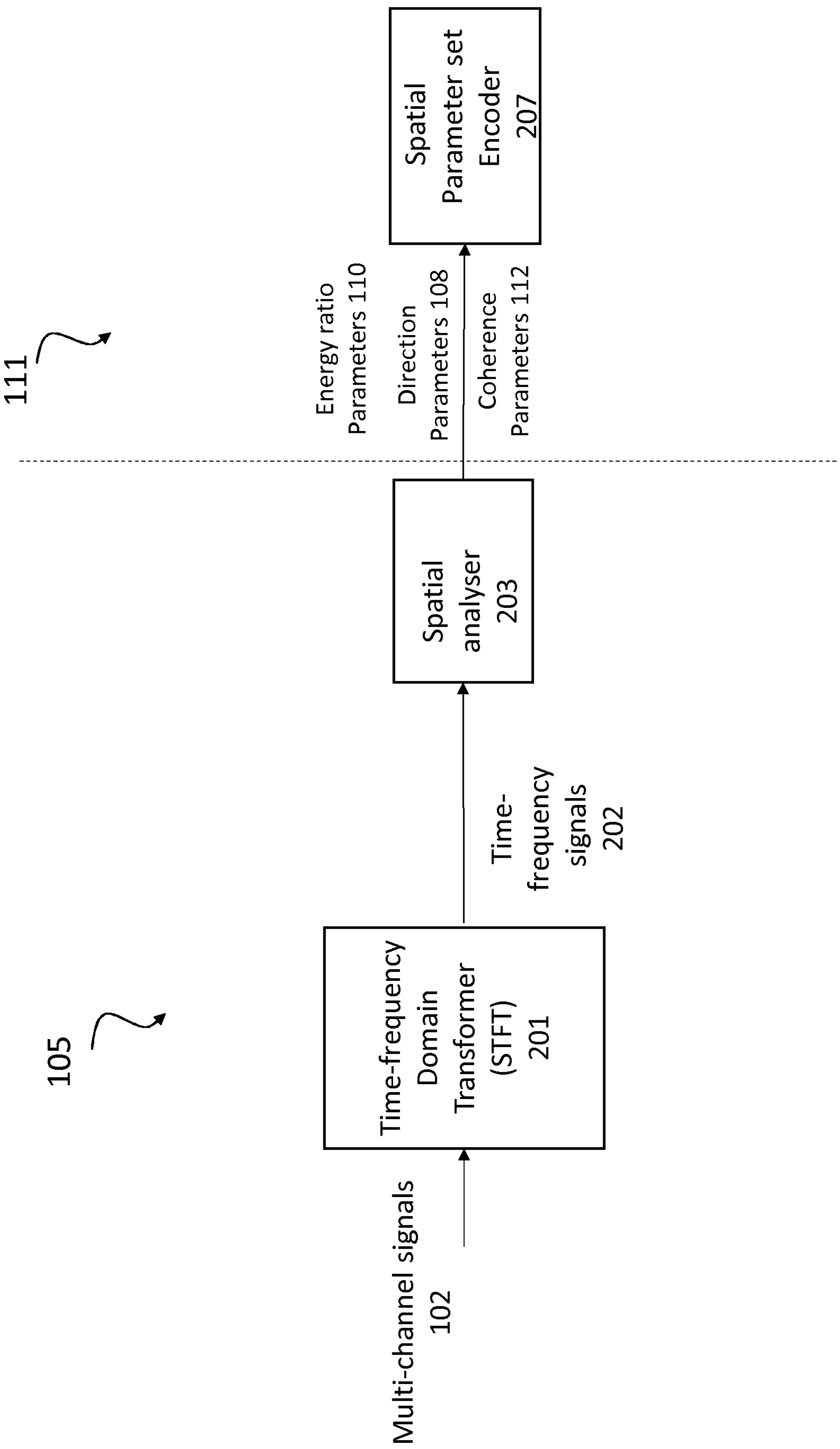
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index $k=0, \ldots, K-1$. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits per sound source direction. For two sound source directions per TF tile there would be a need of 2×64 bits for the complete encoding of both directions. It is to be noted that the use of the term sound source can signify dominant directions of the propagating sound in the TF tile.

Embodiments aim to reduce the number of bits when there is more than one sound source direction per TF tile.

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth $\phi(k,n)$, and elevation $\theta(k,n)$. The direction parameters 108 for the time sub frame may be also be passed to the spatial parameter set encoder 207.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k,n) between a microphone pair at band k, the value of the cross-correlation parameter lies between −1 and 1. The direct-to-total energy ratio parameter r(k,n) can be determined by comparing the normalized cross-correlation parameter to a diffuse field normalized cross correlation parameter $cor'_D(k,n)$ as $$r(k,n) = \frac{\mathrm{cor}'(k,n) - \mathrm{cor}'_D(k,n)}{1 - \mathrm{cor}'_D(k,n)}.$$

The direct-to-total energy ratio is explained further in PCT publication WO2017/005978 which is incorporated herein by reference. The energy ratio may be passed to the spatial parameter merger 207.

In embodiments the parameters relating to a second direction (for the TF tile) may be analysed using higher-order directional audio coding with HOA input or the method as presented in the PCT publication WO2019/215391 with mobile device input. Details of Higher-order directional audio coding may be found in the IEEE Journal of Selected Topics in Signal Processing "Sector-Based Parametric Sound Field Reproduction in the Spherical Harmonic Domain," Volume 9 Issue 5.

The spatial analyser 203 may furthermore be configured to determine a number of coherence parameters 112 which may include surrounding coherence (γ(k,n)) and spread coherence (ζ(k,n)), both analysed in time-frequency domain.

The spatial analyser 203 may be configured to output the determined coherence parameters spread coherence parameter ζ and surrounding coherence parameter γ to the spatial parameter set encoder 207.

Therefore, for each TF tile there will be a collection of spatial audio parameters associated with each sound source direction. In this instance each TF tile may have the following spatial parameters associated with it on a per sound source direction basis; an azimuth and elevation denoted as azimuth ϕ(k,n), and elevation θ(k,n), a spread coherence (γ(k,n)) and a direct-to-total energy ratio parameter r(k,n). In addition, each TF tile may also have a surround coherence (ζ(k,n)) which is not allocated on a per sound source basis.

In the case of two sound source directions, the collection of spatial audio parameters for each TF tile may at least comprise the azimuth $\phi_1(k,n)$ and elevation $\theta_1(k,n)$ spherical direction component, as well as the energy to total ratio for a first sound source direction and the azimuth $\phi_2(k,n)$ and elevation $\theta_2(k,n)$ spherical direction components and the energy to total ratio for a second source direction.

It is to be appreciated that the subsequent processing steps maybe performed on a per TF tile basis. In other words, the processing is performed for each sub band k and sub frame n of an audio frame.

Studies have indicated that on a TF tile basis a first sound source direction is more likely to point in an opposite direction to a second sound source direction. This observation may be used to improve the subsequent quantisation efficiency of the azimuth and elevation direction parameters. For instance, if the first (or second) sound source may be brought into a closer alignment by a rotation of 180° then the difference (or variance) between the two sound source direction parameters may be very much reduced. This reduction in variance may be used to improve the (vector) quantisation of the direction parameters. Obviously, the improvement in quantisation efficiency (by rotating one direction parameter 180° relative to the other direction parameter) is achieved when one sound source is originally (pre rotation) pointing in an opposite direction to the second sound source. Thereby when the rotational transformation is applied the direction parameters of the first and second sound sources will be aligned more closely.

It has been observed (through experiments) that for the majority of instances the first sound source direction is more likely to point in an opposite direction to a second sound source direction, Therefore it may be appropriate to apply a rotational transformation to either the first or second sound source direction parameters in the majority of instances in order to facilitate alignment of the direction parameters before quantisation.

It is to be appreciated in embodiments that the rotational transformation is applied to the spatial audio direction parameter which has not been first initially quantised. For instance, the first spatial audio direction parameter (associated with the first sound source direction) may be quantised initially to give a quantised first spatial audio direction. In this instance the second spatial audio direction parameter may be rotated with respect to the quantised first spatial audio direction parameter.

To that end the following steps may be applied before quantisation of the spatial audio direction parameters for a TF tile:

1. Quantise a first spatial audio direction parameter (for a first sound source direction)
2. Apply a rotational transformation to the direction parameters of the second sound source direction.
3. Once a direction parameter has been rotated relative to the other direction parameter within the same TF tile, the difference between the rotated (second) direction parameter and the other quantised (first) direction parameter may be obtained to form the pre-step to quantisation.

The above approach may be laid out in terms of the azimuth direction parameters for the first and second sound source directions.

Where $\phi_2 \in [-180,180)$

1. If $\hat{\phi}_1 < 0$, $d\phi = \phi_2 - (\widehat{\phi_1} + 180)$
2. Else $d\phi = \phi_2 - (\widehat{\phi_1} - 180)$
3. End where $\widehat{\phi_1}$ is the quantized azimuth value of the first sound source direction and $\phi_2$ is the second sound source direction for the TF tile. In the above steps, it is the second sound source direction $\phi_2$ which is aligned (or rotated) relative to the first sound source quantized direction $\hat{\phi}_1$. The difference between the rotated second direction parameter and the quantised first direction parameter is given as dϕ. The difference direction parameter dϕ may then be quantised. Quantisation of $\phi_1$ and dϕ may be performed according to techniques listed below.

The above approach may be also applied to the direction elevation values $\theta_1(k,n)$ and $\theta_2(k,n)$ for the TF tile (k,n). Alternatively, the above method may also be applied to values both on the elevation axis and azimuth axis.

However, it was further observed that the elevation values were generally found to be more or less aligned and less inclined to lie in opposite directions for the TF tiles of an audio frame. Therefore, in some embodiments the above rotation transformation was solely implemented for the azimuth values, as depicted by the above algorithm.

In some embodiments the process as outlined by steps 1 to 3 above (that is performing the rotational transformation is applied on the second spatial audio direction parameter) may be dependent on the direct-to-total energy ratio parameter for the first sound source direction $r_1(n,k)$ (or $r_1$ dropping the nomenclature for the n,k tile). In these embodiments the processing steps may be applied on a TF tile basis as:

1. Quantise a first spatial audio direction parameter (for a first sound source direction).
2. Check the value of the first energy to total ratio for the first sound source direction $r_1$. If the value of $r_1$ is above a predetermined threshold value (for $r_1$) then perform steps 3 and 4. However if the value of $r_1$ is below (or equal) to the predetermined threshold value (for $r_1$) then do not perform steps 3 and 4 below. Instead the first spatial audio direction parameter is quantised without the rotational transform.
3. Apply rotational transformation to the direction parameters of second sound source direction.

4. Once a direction parameter has been rotated relative to the other direction parameter within the same TF tile, the difference between the rotated (second) direction parameter and the other quantised (first) direction parameter may be obtained to form the pre-step to quantisation.

In other embodiments the application of the above rotational transformation steps may be conditional upon the number of bits available for quantising the first spatial audio direction parameter. In these embodiments the processing steps may be applied on a TF tile basis as:

1. Quantise a first spatial audio direction parameter (for a first sound source direction).
2. Check if the number of bits available to quantise the first spatial audio direction parameter is above a predetermined threshold value (for available bits) then perform steps 3 and 4. However if the number of bits is below (or equal) to the predetermined threshold value (for available bits) then do not perform steps 3 and 4 below. Instead the first spatial audio direction parameter is quantised without the rotational transform.
3. Apply rotational transformation to the direction parameters of second sound source direction.
4. Once a direction parameter has been rotated relative to the other direction parameter within the same TF tile, the difference between the rotated (second) direction parameter and the other quantised (first) direction parameter may be obtained to form the pre-step to quantisation.

Figure 3:
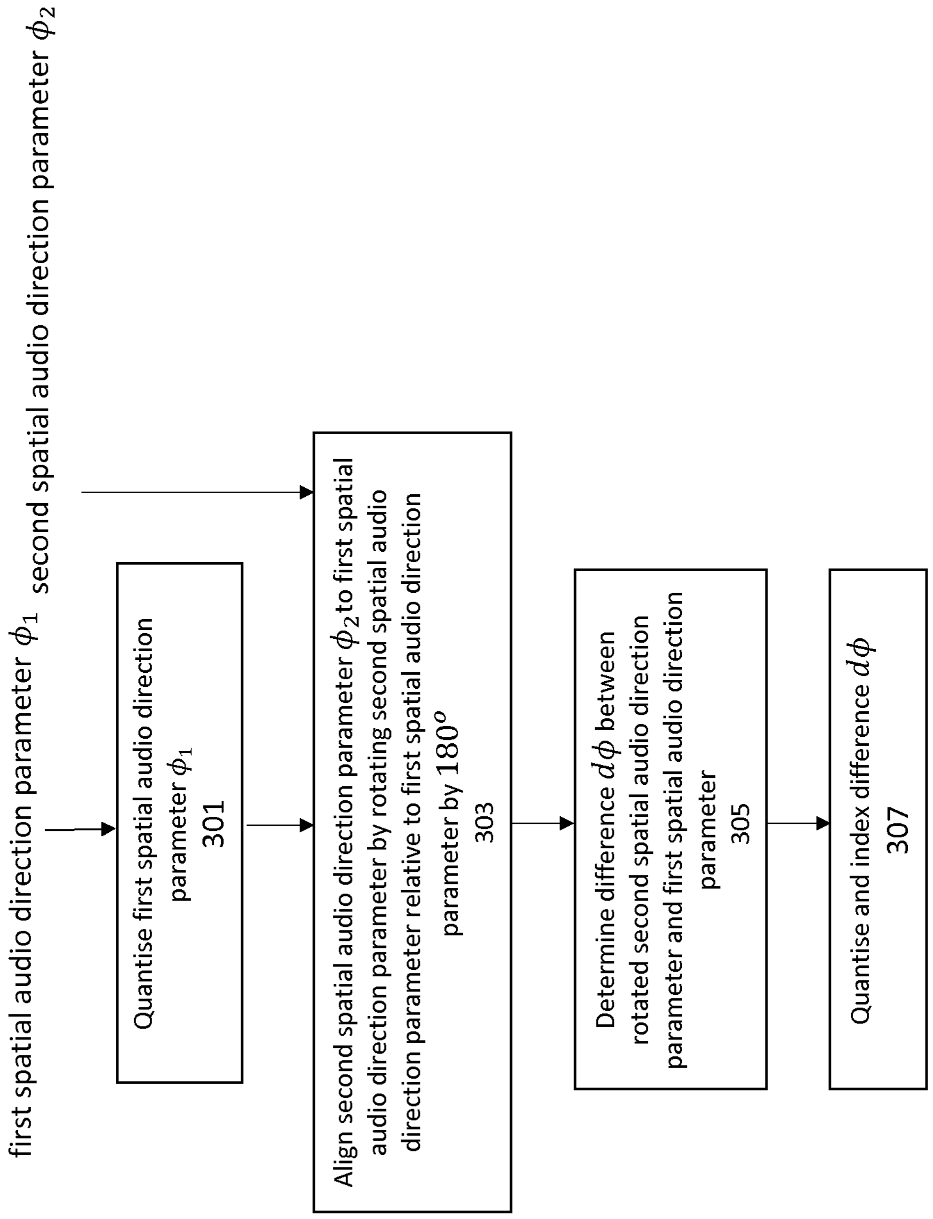
FIG. 3 shows a flow diagram of the operation of the metadata encoder as shown in FIG. 2 according to some embodiments.

FIG. 3 depicts a computer software or hardware implementable process for rotating the spatial audio direction parameters (such as the azimuth and elevation values) as a pre-step to quantisation.

Processing step 301 shows the step of quantising the first spatial audio direction parameter, for example the azimuth value associated with a first sound source direction in a TF tile.

Processing step 302 depicts the step of transforming the second spatial audio direction parameter (for example the azimuth value associated with a second sound source direction in the TF tile) by rotating the direction parameter to be in an opposite direction. In embodiments this may be implemented by rotating an angular value (e.g. azimuth value) of the second spatial audio direction parameter by 180 degrees.

Processing step 305 depicts the step of determining the difference between the transformed (or rotated) second spatial audio direction parameter and the first (quantised) spatial audio direction parameter. For example, the difference between the rotated azimuth value of the second spatial audio direction parameter and the azimuth value of the first spatial audio direction parameter.

Finally, processing step 307 depicts the step of quantising the difference generated by step 305.

The spatial parameter set encoder 207 can be arranged to quantize direction parameters 108 in addition to the energy ratio parameters 110 and coherence parameters 112.

Quantization of the direction parameters 108 (such as the azimuth $\phi(k,n)$ and elevation $\theta(k,n)$) may be based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. The azimuth $\phi(k,n)$ and elevation $\theta(k,n)$ direction parameters 108 may then be mapped to points spherical grid uses a vector distance metric in order to provide a quantization index to the spherical grid. Such a spherical quantization scheme may be found in the patent application publications WO2019/091575 and WO2019/129350. Alternatively, the azimuth $\phi(k,n)$ and elevation $\theta(k,n)$ direction parameters 108 may be quantized according to any suitable linear or non-linear quantization means.

With reference to the above algorithm and processing steps of FIG. 3 the first azimuth value $\phi_1$ may be quantised according to any of the quantisation techniques listed above and then the difference azimuth value $d\phi$ may also be quantised using the same quantisation technique as used for the first azimuth value $\phi_1$. Accordingly, in a preferred embodiment the following quantised direction parameters $\widehat{d\phi}$, $\hat{\phi}_1$, $\hat{\theta}_1$ and $\hat{\theta}_2$ may be produced for each TF tile having two sound source directions.

The metadata encoder/quantizer 111 may also comprise an energy ratio parameter encoder which may be configured to receive the energy ratio parameter(s) for each TF tile and perform a suitable compression and encoding scheme.

Similarly, the spatial parameter set encoder 207 may also comprise a coherence encoder which is configured to receive the surround coherence values $\gamma$ and spread coherence values $\zeta$ and determine a suitable encoding for compressing the surround and spread coherence values.

The encoded direction, energy ratios and coherence values may be passed to a combiner. The combiner may be configured to receive the encoded (or quantized/compressed) directional parameters, energy ratio parameters and coherence parameters and combine these to generate a suitable output (for example a metadata bit stream which may be combined with the transport signal or be separately transmitted or stored from the transport signal).

In some embodiments the encoded datastream is passed to the decoder/demultiplexer 133. The decoder/demultiplexer 133 demultiplexes the encoded the quantized spatial audio parameter sets for the frame and passes them to the metadata extractor 137 and also the decoder/demultiplexer 133 may in some embodiments extract the transport audio signals to the transport extractor for decoding and extracting.

The encoded audio spatial parameter energy ratio indices, direction indices and coherence indices may be decoded by their respective decoders in the metadata extractor 137 to generate the decoded energy ratios, directions and coherences for a TF tile. This can be performed by applying the inverse of the various encoding processes employed at the encoder.

According to some embodiments the spatial audio parameter direction indices may comprise indices indicating the following quantised direction parameters $\widehat{d\phi}$, $\hat{\phi}_1$, $\hat{\theta}_1$ and $\hat{\theta}_2$ for each TF tile having two sound source directions. The spatial audio parameter direction indices may be used by the metadata extractor 137 to produce the de-quantised parameters $\widehat{d\phi}$, $\hat{\phi}_1$, $\hat{\theta}_1$ and $\hat{\theta}_2$ for each TF tile by the process of de-quantisation.

In embodiments the decoded spatial audio direction parameters for a TF tile may be found by the following steps:

1. Add the quantised difference (between the rotated (second) direction parameter and the quantised (first) direction parameter) to the quantised first direction parameter. To give the rotated quantised second direction parameter.

2. Apply a rotational transformation to the rotated quantised second direction parameter in order to rotate the rotated quantised second direction parameter to have an opposite direction. Thereby giving the quantised second direction parameter. The rotational transformation, as applied to the rotated second direction parameter, may be the corollary to the rotation applied at the encoder. For instance, if the encoder utilised a rotation of 180°, then the decoder should apply a corollary rotation of 180° in order to transform the rotated second direction parameter back to the second direction parameter.

Dependent on the particular encoding scheme adopted at the encoder, the decoder may implement the above processing steps solely for the azimuth values of the spatial audio parameters of the TF tile, or the direction elevation values, or alternatively the direction values on both the elevation and azimuth axes. It is to be noted that in the case of the encoder deploying a conditional scheme for encoding the spatial audio direction parameters, then the decoding process may also follow suit.

For instance, when the encoder uses the scheme dependent on the direct-to-total energy ratio parameter for the first sound source direction $r_1(n,k)$ as described above. The decoder may decode the spatial audio direction parameters according to the above decoding steps 1 and 2, when the result of checking the value of the first energy to total ratio for the first sound source direction $r_1$ for the TF tile is above the predetermined threshold (for $r_1$.)

Similarly, when the encoder uses the scheme dependent on the number of bits available to quantise the spatial audio direction parameters. The decoder may decode the spatial audio direction parameters according to the above decoding steps 1 and 2, when the result of checking the number of bits used to encode the spatial audio direction parameters is above the predetermined threshold value (for bits used).

Generally, de-indexing refers to the process of converting an index representing a quantized parameter to the quantized parameter. This process typically involves converting the index to a quantized value via a de-quantizer. A de-quantizer may comprise a table or codebook holding dequantized values and/or processing functionality which may be used to produce the final dequantized values. The decoded spatial audio parameters may then form the decoded metadata output from the metadata extractor 137 and passed to the synthesis processor 139 in order to form the multi-channel signals 110.

Figure 4:
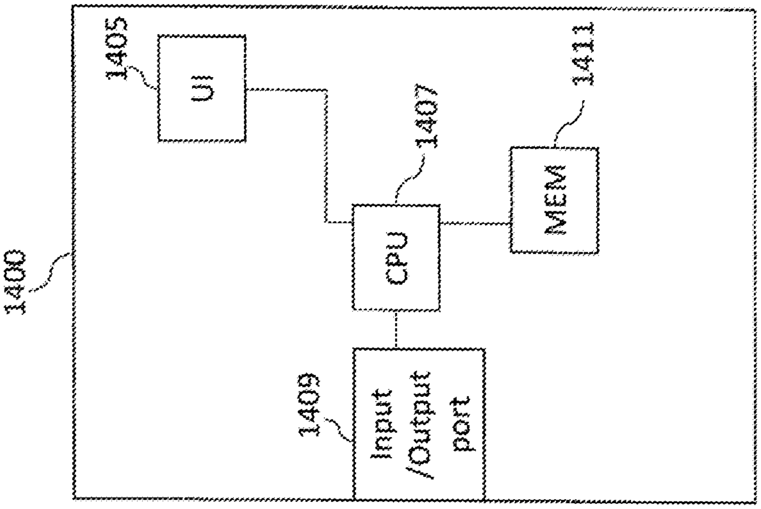
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for spatial audio signal encoding comprising:

determining or receiving, for two or more audio signals, a first spatial audio direction parameter and a second spatial audio direction parameter for providing spatial audio reproduction;

quantising the first spatial audio direction parameter;

transforming the second spatial audio direction parameter to have an opposite spatial audio direction;

determining a difference between the transformed second spatial audio direction parameter and the quantized first spatial audio direction parameter; and quantising the difference.

2. The method as claimed in claim 1, wherein transforming the second spatial audio direction parameter to have an opposite spatial audio direction, determining a difference between the transformed second spatial audio direction and parameter and the quantized first spatial audio direction parameter, and quantising the difference are conditional upon a first direct-to-total energy ratio parameter for the two or more audio signals being greater than a pre-determined threshold value.

3. The method as claimed in claim 1, wherein transforming the second spatial audio direction parameter to have an opposite spatial audio direction, determining a difference between the transformed second spatial audio direction parameter and the quantized first spatial audio direction parameter, and quantising the difference are conditional upon a number of bits used to quantise the quantized first spatial audio direction parameter being above a pre-determined threshold value.

4. The method as claimed in claim 1, wherein transforming the second spatial audio direction parameter to have an opposite spatial audio direction comprises:

rotating the second spatial audio direction parameter by an angle of one hundred and eighty degrees.

5. A method for spatial audio signal decoding comprising:

adding a quantized difference to a quantized first spatial audio direction parameter to give a second spatial audio direction parameter, wherein the quantized difference is a quantized difference between the second spatial audio direction parameter and the quantized first spatial audio direction parameter; and transforming the second spatial audio direction parameter to have an opposite spatial audio direction.

6. The method as claimed in claim 5, wherein adding the quantized difference to the quantized first spatial audio direction parameter to give the second spatial audio direction parameter, and transforming the second spatial audio direction parameter to have an opposite spatial audio direction are conditional upon a first direct-to-total energy ratio parameter being greater than a pre-determined threshold value.

7. The method as claimed in claim 5, wherein adding the quantized difference to the quantized first spatial audio direction parameter to give the second spatial audio direction parameter, and transforming the second spatial audio direction parameter to have an opposite spatial audio direction are conditional upon a number of bits used to quantise the quantized first spatial audio direction parameter being above a pre-determined threshold value.

8. An apparatus for spatial audio signal encoding comprising:

at least one processor; and at least one memory including computer program code, the at least one memory and the computer program code configured to, with the at least one processor, cause the apparatus at least to:

determine or receive, for two or more audio signals, a first spatial audio direction parameter and a second spatial audio direction parameter for providing spatial audio reproduction;

quantise the first spatial audio direction parameter;

transform the second spatial audio direction parameter to have an opposite spatial audio direction;

determine a difference between the transformed second spatial audio direction parameter and the quantized first spatial audio direction parameter; and quantise the difference.

9. The apparatus as claimed in claim 8, wherein the apparatus caused to transform the second spatial audio direction parameter to have an opposite spatial audio direction, determine a difference between the transformed second spatial audio direction parameter and the quantized first spatial audio direction parameter, and quantise the difference is conditional upon a first direct-to-total energy ratio parameter for the two or more audio signals being greater than a pre-determined threshold value.

10. The apparatus as claimed in claim 8, wherein the apparatus caused to transform the second spatial audio direction parameter to have an opposite spatial audio direction, determine a difference between the transformed second spatial audio direction parameter and the quantized first spatial audio direction parameter, and quantise the difference is conditional upon a number of bits used to quantise the quantized first spatial audio direction parameter being above a pre-determined threshold value.

11. The apparatus as claimed in claim 8, wherein the apparatus caused to transform the second spatial audio direction parameter to have an opposite spatial audio direction is caused to:

rotate the second spatial audio direction parameter by an angle of one hundred and eighty degrees.

12. The apparatus as claimed in claim 8, wherein the second spatial audio direction parameter comprises an azimuth value, and wherein the quantized first spatial audio direction parameter comprises quantized azimuth value.

13. The apparatus as claimed in claim 12, wherein the apparatus caused to transform the second spatial audio direction parameter to have an opposite spatial audio direction is caused to transform the azimuth value of the second spatial audio direction parameter through one hundred and eighty degrees, and wherein the apparatus caused to determine a difference between the transformed second spatial audio direction parameter and the quantized first spatial audio direction parameter is caused to determine the difference between the transformed azimuth value of the second spatial audio direction parameter and the quantized azimuth value of the quantized first spatial audio direction parameter.

14. The apparatus as claimed in claim 8, wherein the first spatial audio parameter is associated with a first sound source direction in a frequency sub band and time sub frame of the two or more audio signals, and the second spatial audio parameter is associated with a second sound source direction in the frequency sub band and the time sub frame of the two or more audio signals.

15. An apparatus for spatial audio signal decoding comprising:

at least one processor; and at least one memory including computer program code, the at least one memory and the computer program code configured to, with the at least one processor, cause the apparatus at least to:

add a quantized difference to a quantized first spatial audio direction parameter to give a second spatial audio direction parameter, wherein the quantized difference is a quantized difference between the second spatial audio direction parameter and the quantized first spatial audio direction parameter; and transform the second spatial audio direction parameter to have an opposite spatial audio direction.

16. The apparatus as claimed in claim 15, wherein the apparatus caused to add the quantized difference to the quantized first spatial audio direction parameter to give the second spatial audio direction parameter, and the transform the second spatial audio direction parameter to have an opposite spatial audio direction is conditional upon a first direct-to-total energy ratio parameter being greater than a pre-determined threshold value.

17. The apparatus as claimed in claim 15, wherein the apparatus caused to add the quantized difference to the quantized first spatial audio direction parameter to give the second spatial audio direction parameter, and the transform the second spatial audio direction parameter to have an opposite spatial audio direction is conditional upon a number of bits used to quantise the quantized first spatial audio direction parameter being above a pre-determined threshold value.

18. The apparatus as claimed in claim 15, wherein the apparatus caused to transform the second spatial audio direction parameter to have an opposite spatial audio direction is caused to:

rotate the second spatial audio direction parameter by an angle of one hundred and eighty degrees.

19. The apparatus as claimed in claim 15, wherein the second spatial audio direction parameter comprises an azimuth value, and wherein the quantized first spatial audio direction parameter comprises a quantized azimuth value.

20. The apparatus as claimed in claim 19, wherein the apparatus caused to transform the second spatial audio direction parameter to have an opposite spatial audio direction is caused to transform the azimuth value of the second spatial audio direction parameter through one hundred and eighty degrees, and wherein the apparatus caused to add the quantized difference to the quantized first spatial audio direction parameter to give the second spatial audio direction parameter is caused to add the quantized difference to the quantized azimuth value of the quantized first spatial audio direction parameter.

* * * * *